United States Patent [19]

Kammeraad et al.

[11] 4,414,723
[45] Nov. 15, 1983

[54] ADJUSTABLE CYLINDER HEAD HOLDER

[75] Inventors: James A. Kammeraad, Holland, Mich.; Ronald L. Tiger, Joplin, Mo.

[73] Assignee: K-Line Industries, Inc., Holland, Mich.

[21] Appl. No.: 272,715

[22] Filed: Jun. 11, 1981

Related U.S. Application Data

[62] Division of Ser. No. 94,453, Nov. 15, 1979, abandoned.

[51] Int. Cl.³ .............................................. B23Q 3/04
[52] U.S. Cl. ..................... 29/26 A; 408/75; 408/709
[58] Field of Search .............. 29/26 A, 26 R; 408/80, 408/1 R, 75, 709; 269/47, 71

[56] References Cited

U.S. PATENT DOCUMENTS

| | | |
|---|---|---|
| 1,060,430 | 8/1913 | Crecelius . |
| 1,474,212 | 2/1923 | Statham . |
| 2,106,325 | 1/1938 | Henry . |
| 2,188,433 | 1/1940 | Friese ................... 269/71 |
| 2,211,287 | 8/1940 | Neubig et al. . |
| 2,834,233 | 5/1958 | Anderson . |
| 3,048,387 | 8/1962 | Waggoner . |
| 3,261,599 | 7/1966 | Holmen . |
| 3,333,487 | 8/1967 | Parry ...................... 408/80 |
| 3,764,204 | 10/1973 | Kammeraad ............ 408/75 |
| 3,782,847 | 1/1974 | Kulzer ................... 408/1 R |
| 3,977,805 | 8/1976 | Wanovs ................. 408/709 X |
| 4,127,942 | 12/1978 | Flaten ................... 408/75 X |
| 4,140,306 | 2/1979 | Wheeler ................. 269/47 |
| 4,145,006 | 3/1979 | Webb .................... 269/47 |

FOREIGN PATENT DOCUMENTS

| | | | |
|---|---|---|---|
| 303798 | 2/1918 | Fed. Rep. of Germany ........ 269/71 |
| 298008 | 6/1902 | France .................... 269/71 |

OTHER PUBLICATIONS

Winona Tool Manufacturing Company Publication
Kwik-Way Publication.

*Primary Examiner*—William R. Briggs
*Attorney, Agent, or Firm*—Price, Heneveld, Huizenga & Cooper

[57] ABSTRACT

Apparatus for reworking the valve guides of a cylinder head is disclosed. The apparatus includes an adjustable cylinder head holder including a base, a pedestal and a heat support subassembly permitting positioning of the head rotationally about its longitudinal axis as well as pivotally about a transverse axis. A pair of such cylinder head supports are supported on an elongated member for transverse adjustable movement. The elongated member is supported on a bed plate beneath the spindle of a drill press. Valve guide reworking tools secured to the spindle by a U-joint are aligned with and guided through the valve guides by a valve guide boring fixture securable to the cylinder head.

9 Claims, 5 Drawing Figures

ADJUSTABLE CYLINDER HEAD HOLDER

This is a division of Ser. No. 094,453, filed Nov. 15, 1979, and now abandoned.

BACKGROUND OF THE INVENTION

The present invention relates to apparatus for reworking the valve guides of an internal combustion engine including apparatus for supporting and positioning a cylinder head during valve guide reworking operations.

The valve guides of an internal combustion engine become excessively worn during extended use. The tolerances between the valve stem and the valve guide must be maintained fairly close in order for the engine to operate efficiently. Heretofore, a fairly wide variety of tools, machines and supports have been proposed for use in repairing the valve guides of internal combustion engine cylinder heads. A typical method by which the valve guides are reworked includes the step of boring the worn valve guides, inserting a tubular insert and then reaming the insert to required tolerances. Such a method is taught, for example, in commonly owned U.S. Pat. No. 3,828,756 entitled Method and Apparatus for Rebuilding Valve Guides and issued on Aug. 13, 1974 to Kammeraad et al.

During the rebuilding and reworking of the valve guides, the cylinder head must be supported and positioned to permit the performance of the boring and reaming operations. Fairly large, complex and expensive machines have been developed for such reworking operations. These machines are large and relatively immovable and require the precise mounting of a cylinder head at a proper angle in order to produce the proper reworking alignment. Such machines typically include a heavy duty, geared head press, a custom table and an adjustable head cradle. The internal combustion engine cylinder head is mounted in the cradle which is adjustable to permit proper positioning of the head relative to the head press. Rotational and angular positioning of the cylinder head is necessary since many cylinder heads include canted or nonperpendicular valve guides.

Smaller tools mountable directly on the cylinder head and which permit the reworking of the valve guides with hand-operated tools have also been proposed. An example of one such apparatus may be found in commonly owned U.S. Pat. No. 3,764,204, entitled Valve Guide Boring Fixture and issued on Oct. 9, 1973 to Kammeraad. This patent discloses a generally U-shaped boring fixture mountable on a cylinder head at the valve guide. The fixture includes a guide arm securable to the cylinder head at the valve seat and a guide arm engageable with the cylinder head at the valve spring seat. The first guide arm includes an adjustably mounted axial bore adapted to guide various valve guide reworking tools. When using a valve guide boring fixture of this type, the cylinder head is supported on head support stands in order to provide sufficient clearance above and below the head to mount the boring fixture.

Different forms of cylinder head stands or holders have heretofore been proposed. Examples may be found in U.S. Pat. No. 3,261,599, entitled Cylinder Head Holder and issued on July 19, 1966 to Holmen and U.S. Pat. No. 3,048,387, entitled Holding Fixture for Cylinder Heads and issued on Aug. 7, 1962 to Waggoner. The cylinder head holder disclosed in the Holmen patent includes a base and a vertically extending tapered rod. The rod is adapted to be inserted through a bolt hole of a cylinder head. A pair of such holders are positioned at each end of the cylinder head to support the head in a single, nonadjustable position. The head may, however, be mounted on the holders with either side up.

The stand disclosed in the Waggoner patent includes a base plate and a cylindrical post through which extends a rotatable and transversely positionable rod. The rod supports on one end an elongated bar securable to the cylinder head and a segmental plate connected to the bar. The plate structure and rod permit the cylinder head to be rotated about an axis perpendicular to the top and bottom of the cylinder head and also swinging adjustment of the bar and head relative to the post. The stand disclosed in the Waggoner patent, therefore, permits some angular, rotational and vertical adjustment of the head relative to a bench or other support surface. Adjustment of the head is not, however, accomplished in a single vertical plane.

Heretofore, apparatus has not been available for adjustably supporting a cylinder head in a plurality of longitudinal and transverse axial positions within the same plane. Further, apparatus has not been available which would permit the reworking of the valve guides in a conventional drill press.

SUMMARY OF THE INVENTION

In accordance with the present invention, apparatus is provided for supporting a cylinder head during valve guide reworking which permits rotational adjustment of the cylinder head about its longitudinal axis as well as transverse axial adjustment so that one end of the cylinder head may be raised above the other end. Further, apparatus is provided for the reworking of the valve guide with a conventional drill press. Essentially, the cylinder head support apparatus includes a base structure, a pedestal and head support means mounted on the pedestal for supporting a cylinder head and permitting positioning of the head about a longitudinal and a transverse axis. Further, provision is made for vertical adjustment of the head support means relative to the pedestal.

In further aspects of the invention, apparatus is provided for supporting a pair of cylinder head stands and positioning the stands and a cylinder head beneath the spindle of a drill press. A valve guide boring fixture can then be positioned on the cylinder head and reworking accomplished by reworking tools rotated by the drill press through a universal joint. The cylinder head stands are laterally movable on the positioning means to permit accurate alignment of a head relative to the drill press spindle.

The cylinder head stands in accordance with the present invention support a cylinder head permitting the head to be rotated about its longitudinal axis through an angle of 360°. This easily permits the head to be turned over after it is mounted on the stand. The transverse angular adjustment feature of the stand permits one end of the cylinder head to be supported above its other end. This permits accurate positioning of the head for ease of working of canted or nonperpendicular valve guides. The stands and positioning means permit reworking of the cylinder head employing a conventional drill press. This has not, heretofore, been readily accomplished.

DETAILED DESCRIPTION OF THE PREFERRED EMBODIMENT

Figure 1:
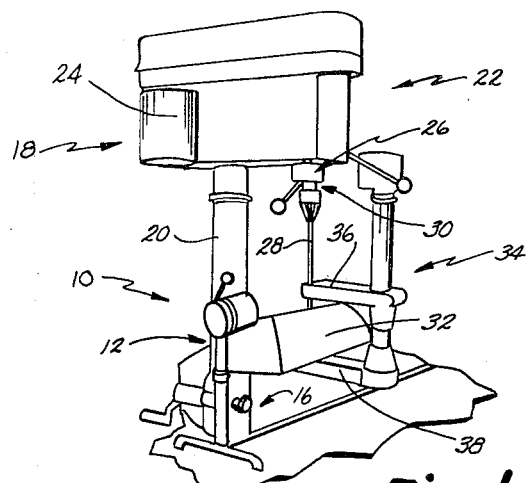
FIG. 1 is a fragmentary, perspective view of a cylinder head mounted on a holding apparatus and positioned beneath the head of a drill press in accordance with the present invention.
Figure 4:
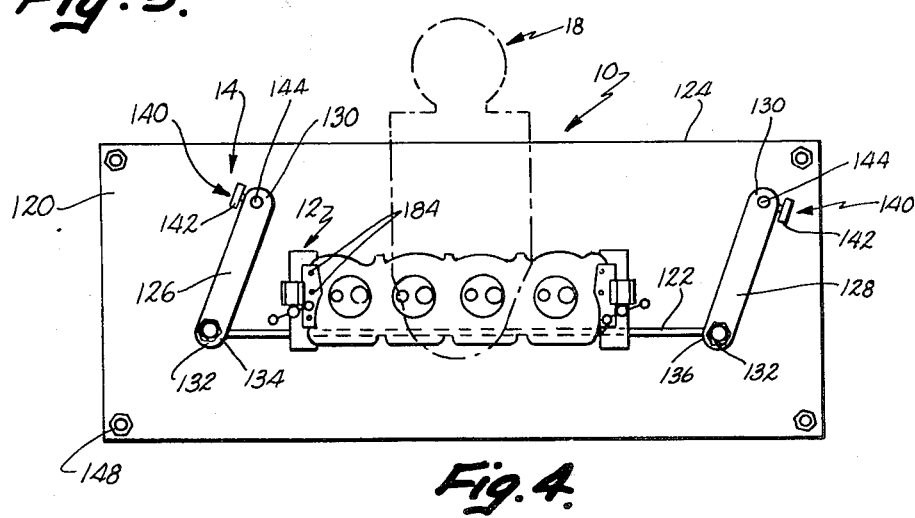
FIG. 4 is a top plan view of a positioning subassembly incorporated in the present invention.

The preferred embodiment of the valve guide reworking apparatus and cylinder head support apparatus in accordance with the present invention is illustrated in FIGS. 1 and 4 and generally designated 10. Apparatus 10 includes a pair of cylinder head stands or head support means 12 mounted on a positioning subassembly 14 which in turn is positioned on a bed 16 of a drill press 18. The drill press 18 is conventional in nature and includes a vertically oriented post 20 upon which is positioned a head subassembly 22. The head subassembly includes a suitable electric motor 24 for driving a spindle 26. In the preferred embodiment of the present invention, a valve guide reworking tool 28 is rotated by the spindle 26 through a U-joint 30.

FIG. 1 illustrates a cylinder head 32 supported in proper angular relationship and positioned beneath the spindle 26 on stands 12. Secured to the cylinder head is a valve guide boring fixture generally designated 34. Valve guide boring fixture 34 is of the type illustrated and described in commonly owned U.S. Pat. No. 3,764,204, entitled Valve Guide Boring Fixture and issued on Oct. 9, 1973 to John H. Kammeraad, the disclosure of which is hereby incorporated by reference. The valve guide boring fixture 34 includes a first guide arm 36 and a second guide arm 38. The first guide arm 36 supports a valve seat engaging means (not shown) which includes a ball swivel guide, a boring guide or drill bushing and a valve seat adaptor. The second guide arm 38 supports a spring seat adaptor (not shown). Fixture 34 may be accurately aligned with the valve guide to be bored and reworked. The fixture provides accurate guidance of a reworking tool 28 preventing the tool from straying from a properly aligned axis through the valve guide during the reworking operation.

Figure 2:
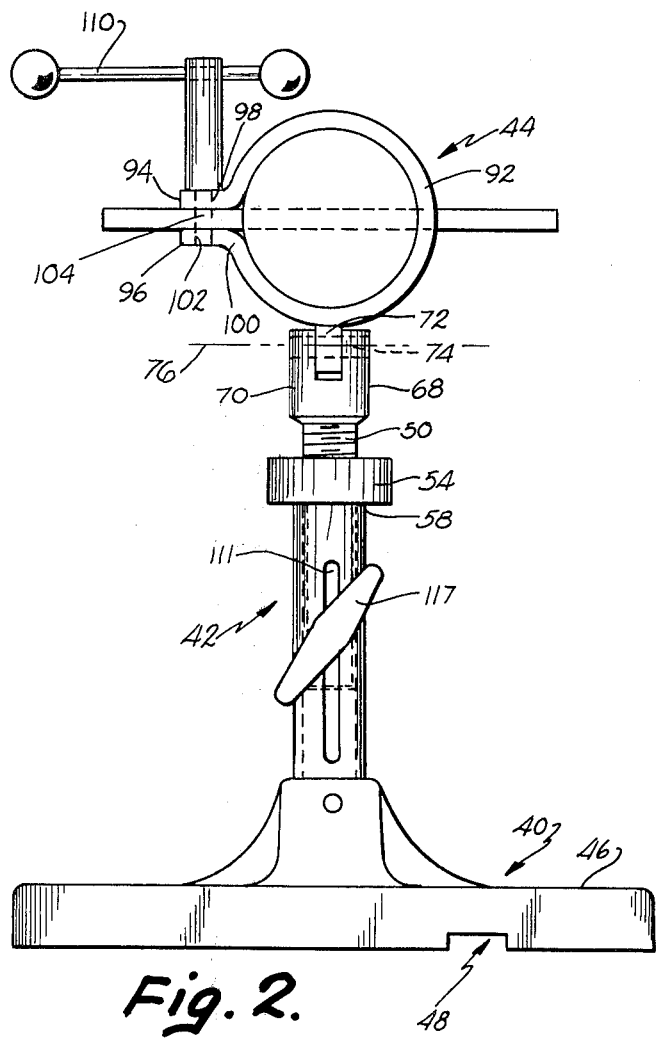
FIG. 2 is a front, elevational view of a cylinder head stand in accordance with the present invention.
Figure 3:
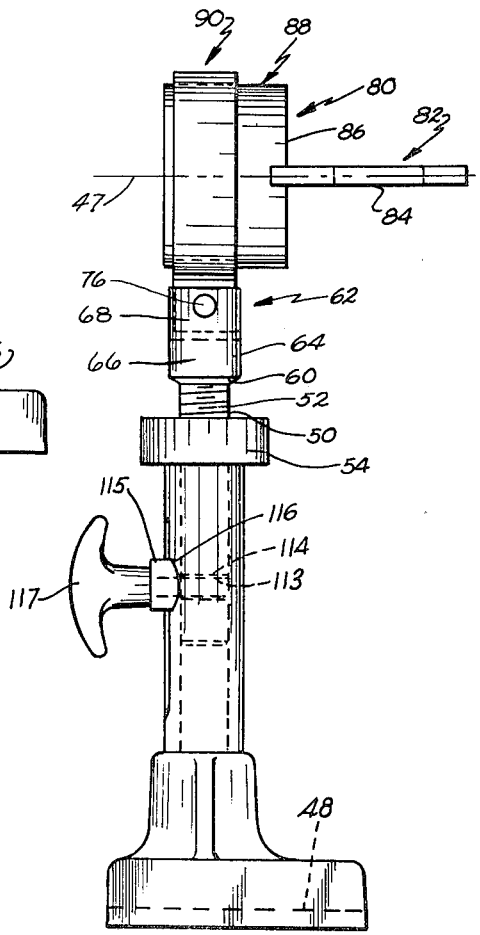
FIG. 3 is a side, elevational view of the cylinder head stand.

The adjustable head holder or stand is best seen in FIGS. 2 and 3. As shown therein, the stand includes a base 40, a pedestal 42 and an adjustable head support means 44. The pedestal 42 is a hollow, tubular cylindrical item and extends vertically and generally centrally from an upper surface 46 of base 40. As seen in FIG. 2, base 40 defines a transverse slot 48 therethrough. Pedestal 42 may be secured within a boss formed integral with the upper surface 46 of base 40 or the pedestal may be welded to the upper surface of the base.

The head support means 44 permits rotational adjustment of a cylinder head about its longitudinal axis 47 (FIGS. 3 and 5) as well as angular adjustment of the head about a transverse axis 76 (FIGS. 2 and 3). The axes are mutually perpendicular and lie in parallel, horizontal planes. Means 44 includes a post 50 which is threaded along its length 52. Post 50 is dimensioned to be telescopingly received within pedestal 42.

Vertical positioning of post 50 is accomplished by a vertical adjustment nut 54 having a threaded through bore 56. Nut 54 rests on the upper end 58 of pedestal 42 and threadably engages post 50. As a result, rotation of nut 54 shifts post 50 vertically with respect to pedestal 42 and base 40.

Secured to top 60 of post 50 is a knuckle joint 62. Knuckle joint 62 includes a first bifurcated or yoke member 64 having a base 66 welded, formed integral with, or otherwise suitably secured to the post and a pair of opposed, spaced, parallel legs 68, 70. A pivot piece or pivoting member 72 of the joint is disposed between legs 68, 70 and a pivot pin 74 extends through the legs and the pivot member. As a result, member 72 is pivotal about an axis 76 lying within a horizontal plane which is parallel with the top surface 46 of base 40.

Supported on pivot member 72 is a rotational adjustment and cylinder head engaging means 80. Means 80 includes an elongated, generally flat plate 82 formed with suitable slots 84 extending between the top and bottom surfaces thereof. Plate 82 is adapted to be secured to a cylinder head by suitable bolts passing through the slots 84 and through the cylinder head bolt holes. Plate 82 is welded or otherwise suitably secured to an end face 86 of a generally cylindrical, plug-like member 88. Member 88 is held by a band-type, circular clamp 90. Clamp 90 is welded or otherwise suitably secured to pivot piece 72. Clamp 90 includes a circular member 92 which encircles member 88 and has opposed ends 94, 96. In the embodiment illustrated in FIG. 2, ends 94, 96 have aligned bores 98, 100. Bore 100 is internally threaded at 102. A bolt type lock 104 extends through bore 98 and threadably engages bore 100. An extension 106 is secured to bolt 104 and includes a transverse bore 108 through which a handle 110 extends. Rotation of handle 110 permits the opposed ends 94, 96 of the clamp to be moved towards and away from each other. When the clamp is opened up, plate 82 may be positioned by rotation of member 88 within clamp portion 92 about the center axis of member 88. Handle 110 may then be rotated to close the ends towards each other to thereby clamp and position the plate 82. The band clamp and cylindrical member arrangement permit the plate and hence a cylinder head to be rotated about its longitudinal axis through an angle of 360°.

Pedestal 42 is formed with an elongated, vertical slot 112. Post 50 adjacent its lower end is formed with a through bore 113 which is threaded along its length. A threaded rod 114 extends through slot 112 and threadably engages the bore 113. Positioned on rod 114 and engaging the surface of pedestal 42 is a washer 115 having a saddleshaped surface 116 which engages the outer surface of the pedestal. A handle 117 is nonrotatably secured to threaded rod 114. Threaded rod 114 permits post 50 to be locked in position. Once the vertical position of the post is set, the operator merely turns the knob 117 which presses the washer 115 into frictional engagement with the outer surface of the pedestal.

The cylinder head may be positioned with either face up and/or with the face positioned at any angle with respect to a horizontal plane. Further, the knuckle joint permits the cylinder head to be tilted or pivoted about a transverse axis at its ends. The axis of rotation of member 88 is perpendicular to the pivot axis of the knuckle joint. The cylinder head, as seen in FIGS. 1 and 4, may be supported by the stands 12 and positioned in multiple angularly related orientations all of which lie in the same vertical plane. Post 50 of one stand may be raised above post 50 of the other stand. Knuckle joints 62 accommodate the angular adjustment. The stands, therefore, readily and accurately position the cylinder head so that boring operations on canted valve guides are easily and readily accomplished.

As seen in FIGS. 1 and 4, the cylinder head stands are supported on a positioning means 14. Positioning means 14 includes a bed plate 120 which is positioned on the base or bed 16 of drill press 18. The positioning apparatus includes an elongated member or link 122 which is movable towards and away from lateral edge 124 of plate 120 in a parallel manner. Links 126, 128 insure that member 122 is always maintained parallel with lateral edge 124. Each link 126, 128 is pivoted at an end 130 to bed plate 120. The opposite ends 132 of the links are pivoted at opposed ends 134, 136, respectively, of the elongated link 122. As best seen in FIGS. 2 and 4, base 40 of each stand 12 is slidably mounted on elongated member 22 with member 22 being received within slot 48. Base 40 of stand 12 and link 122 define a tongue and groove type slide track. As a result, the stands may be slidably positioned on member 122 to permit lateral positioning of the cylinder head relative to the drill press spindle.

Positioning means 14 also includes a pair of lock means 140 at each link 126, 128. Each lock means 140 includes a knurled knob 142. Rotation of knob 142 causes a threaded member to engage pivot pins 144 which pivotally mount links 126, 128. This locks the links in position after the head has been moved under the drill press head.

Also, as seen in FIG. 4, bed plate 120 preferably supports a plurality of leveling screws 148 at each corner thereof. Screws 148 are used to insure that plate 120 is supported in a level position on drill press base 16.

OPERATION

In operation, a cylinder head is supported at each end by stand 12. One end of the cylinder head may be raised above the other end merely by rotation of adjustment nut 54 which raises the post 50 relative to pedestal 42. The posts may then be locked by rotation of handle 117. The transverse angular orientation of the cylinder is accommodated by knuckle joints 62. Rotational adjustment of the cylinder head is accomplished by rotation of plates 82 within band clamps 90. The cylinder head is attached to the support plates 82 by bolts passing through slots 84 and through the cylinder head bolt holes.

Once the cylinder head is supported on stands 12 which rest upon elongated member or link 122 of positioning means 14, link 122 may be pushed towards lateral edge 124 of bed plate 120 in order to move the cylinder head into position under spindle 26 of the drill press 18. Valve guide boring fixture 34 is secured to the cylinder head at the valve guide to be reworked. The fixture is secured in accordance with the description contained in U.S. Pat. No. 3,764,204. The angular orientation of the cylinder head may then be set and the stands locked. When the front-to-back alignment is obtained through positioning means 14, the linkages are locked in position by lock means 140. The cylinder head and stands 112 may then be slidably moved along member 122 until the valve guide reworking tool 28 is properly aligned with the boring fixture 34. U-joint 30 reduces the required accuracy of the alignment. The boring guide fixture 34 may be slightly misaligned from the vertical or longitudinal axis of the spindle and proper operation of the tool 28 will still be obtained through the U-joint 30. This reduces the set-up time and simplifies use of the apparatus.

Once the cylinder head is in position beneath the spindle of the drill press, the press may be operated to feed the tool through the fixture thereby reworking the valve guide. Multiple angular positioning of the cylinder head is obtained in order to properly align a canted valve guide bore with the reworking tool and the spindle of the drill press. Once the reworking operation has been completed on the first valve guide, subsequent reworking is obtained merely by shifting the cylinder head and stands laterally along member 128 until the next valve guide is in position beneath the spindle and reworking tool.

ALTERNATIVE EMBODIMENT

Figure 5:
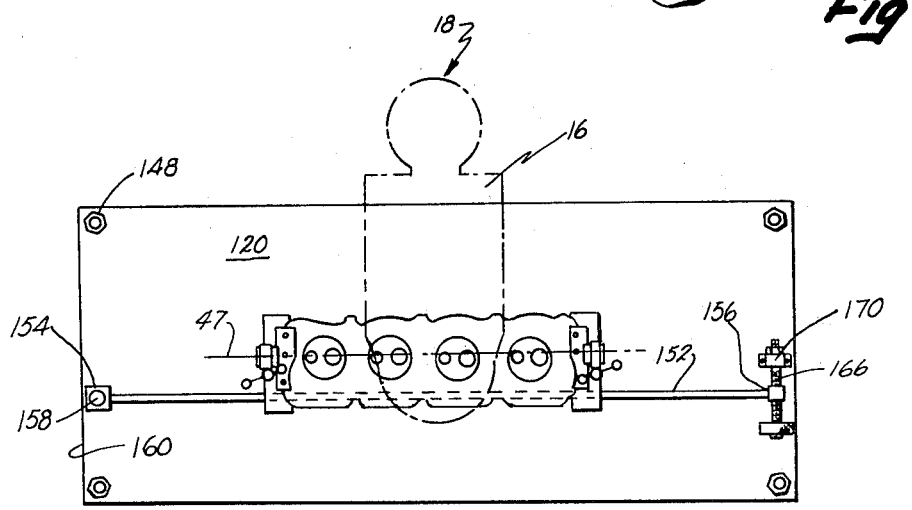
FIG. 5 is a top plan view of an alternative embodiment of the positioning subassembly.

An alternative embodiment of the positioning means is illustrated in FIG. 5 and generally designated 14'. Means 14' includes an elongated bar 152 having ends 154 and 156. End 154 is pivotally secured to bed plate 120 by a pin 158 at a transverse edge 160 of plate 120. A cylinder head 32 is supported on stands 12 as in the previous embodiment. Slots 48 of each stand 12 mounts the stands and the head to bar 152. Bar 152 is adjustable towards and away from lateral edge 124 of plate 120 by an adjustment means 164. Means 164 includes a threaded member 166 threadably engaging a threaded boss 168 on end 156 of bar 152. Member 166 is supported for rotation by a bearing assembly 170 secured to plate 120. A knurled knob 172 is nonrotatably secured to member 166.

As should now be readily apparent, once cylinder head 32 is secured to stands 12 on bar 152, the head may be accurately positioned relative to the reworking tools, by sliding the stands along bar 152 and pivoting of bar 152 towards or away from edge 142 through means 164. Reworking of the valve guides is then accomplished as described above.

The apparatus in accordance with the present invention permits efficient and relatively inexpensive reworking of valve guides employing power tools which have heretofore not been usable for valve guide reworking operations. The apparatus is significantly less expensive and less complicated than the large head machines which have been employed for reworking valve guides. Stands 12 permit easy and ready adjustment of the cylinder head to permit it and the boring fixture to be accurately positioned relative to a conventional drill press. Positioning means 14 permits the front-to-back relationship to be set once during the operation. Also, the linkage structure permits the stands and cylinder head to be moved out from beneath the spindle for removal and mounting of the cylinder head and boring guide fixture. Stands 12 permit the cylinder head to be rotated or turned over so that reworking operations may be performed from either side of the cylinder head. This simplifies preparation of the cylinder head for valve guide reworking and also simplifies replacement of valves and springs. The stands and positioning means are easily and relatively inexpensively manufactured employing conventional materials and methods.

In view of the foregoing description, those of ordinary skill in the art will undoubtedly envision various modifications to the present invention which would not depart from the inventive concepts disclosed. For example, band clamp 20 could employ an overcenter cam lock as opposed to the bolt lock illustrated. The overcenter cam lock would, in fact, be preferred due to its increased simplicity and ease of operation. Also, positioning means other than that shown could be used. The prime consideration is the accurate front-to-back alignment of the cylinder head relative to the drill press. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. An apparatus for supporting a cylinder head in position beneath a drill press during boring of the head valve guides, the drill press including a vertical post and a head, said apparatus comprising:

a base plate positionable below the drill press head;

a pair of transversely spaced, opposed cylinder head stand means for supporting a cylinder head, each of said stand means including means for permitting rotational and means for permitting angular positional adjustment of the cylinder head in a single vertical plane about two perpendicularly related axes; and positioning means on said plate and supporting said pair of stand means for permitting selective positioning of said pair of stand means to valve guide boring positions beneath the drill press head, said pair of stand means being laterally shiftable on said base plate by said positioning means to permit alignment of each valve guide of the cylinder head with the drill press.

2. An apparatus as defined by claim 1 wherein said positioning means comprises:

an elongated member upon which said pair of stand means are supported, each of said stand means including a base member defining a transverse slot through which said elongated member extends, said member thereby defining a track along which each of said stand means may be slidably positioned.

3. An apparatus as defined by claim 1 wherein each of said stand means comprises:

a base member;

a pedestal extending generally vertically from said base member; and a head support means on said pedestal for engaging and supporting the cylinder head, said head support means including means for permitting rotational and angular positioning of the head about a longitudinal axis of the head and a transverse axis of the head, respectively.

4. An apparatus for supporting a cylinder head in position beneath a drill press during boring of the head valve guides, the drill press including a vertical post and a head, said apparatus comprising:

a base plate positionable below the drill press head;

a pair of transversely spaced, opposed cylinder head stand means for supporting a cylinder head, each of said stand means including means for permitting rotational and means for permitting angular positional adjustment of the cylinder head in a single vertical plane; and positioning means on said plate and supporting said pair of stand means for permitting selective positioning of said pair of stand means to valve guide boring positions beneath the drill press head, said pair of stand means being laterally shiftable on said base plate to permit alignment of each valve guide of the cylinder head with the drill press, each of said stand means comprising:

a base member;

a pedestal extending generally vertically from said base member; and a head support means on said pedestal for engaging and supporting the cylinder head, said head support means including means for permitting rotational and angular positioning of the head about a longitudinal axis of the head and a transverse axis of the head, respectively, and wherein said head support means comprises:

a post telescopingly disposed within said pedestal and supporting said head support means; and vertical adjustment means on said pedestal for adjusting the vertical position of said post relative to said pedestal.

5. An apparatus as defined by claim 4 wherein said head support means further comprises:

a knuckle joint on top of said post; and a head support plate mounted on said knuckle joint whereby the post of one of said stand means may be raised higher than the post of the other of stand means so that the cylinder head may be supported below said drill press head with one end higher than the other.

6. An apparatus as defined by claim 4 wherein said head support means further comprises:

a head support plate having a plurality of slots therethrough;

a cylindrical member having an end face to which said plate is secured; and a band clamp encircling said cylindrical member for adjustably positioning said cylindrical member through an angle of 360°, said band clamp being supported by said post.

7. An apparatus as defined by claim 6 wherein said head support means further comprises:

a knuckle joint joining said band clamp to said post, said knuckle joint permitting pivotal movement of said head support plate about an axis in a plane parallel to the plane of the axis of rotation of said cylindrical member and perpendicular thereto.

8. An apparatus as defined by claim 7 wherein said positioning means comprises:

an elongated member upon which said pair of stand means are supported; and a pair of parallel links, each link having an end pivoted to the base plate and an end pivoted to said elongated member, whereby said links restrict said elongated member to parallel movement towards and away from a lateral edge of the base plate.

9. An apparatus as defined by claim 7 wherein said positioning means comprises:

an elongated member upon which said pair of stand means are supported, said elongated member having an end pivoted to said base plate; and adjustment means on said base plate for moving another end of said elongated member towards and away from a lateral edge of said base plate.

* * * * *